(12) United States Patent
Fitzpatrick

(10) Patent No.: US 10,558,878 B2
(45) Date of Patent: Feb. 11, 2020

(54) SYSTEM AND METHOD FOR ORGANIZING EDIBLE OR DRINKABLE MATERIALS

(71) Applicant: Timothy R. Fitzpatrick, New York, NY (US)

(72) Inventor: Timothy R. Fitzpatrick, New York, NY (US)

( * ) Notice: Subject to any disclaimer, the term of this patent is extended or adjusted under 35 U.S.C. 154(b) by 274 days.

(21) Appl. No.: 15/875,029

(22) Filed: Jan. 19, 2018

(65) Prior Publication Data
US 2019/0228250 A1    Jul. 25, 2019

(51) Int. Cl.
| | | |
|---|---|---|
| G06K 9/00 | (2006.01) | |
| G06K 9/03 | (2006.01) | |
| A61J 7/00 | (2006.01) | |
| A61J 7/04 | (2006.01) | |
| G06K 9/34 | (2006.01) | |
| G06K 9/62 | (2006.01) | |

(52) U.S. Cl.
CPC ............ *G06K 9/033* (2013.01); *A61J 7/0069* (2013.01); *A61J 7/0084* (2013.01); *A61J 7/0481* (2013.01); *G06K 9/344* (2013.01); *G06K 9/6202* (2013.01); *A61J 2200/30* (2013.01); *A61J 2205/50* (2013.01); *A61J 2205/60* (2013.01); *G06K 2209/01* (2013.01)

(58) Field of Classification Search
CPC ...... G06K 9/033; G06K 9/344; G06K 9/6202; G06K 2209/01; A61J 7/0069; A61J 7/0084; A61J 7/0481; A61J 2200/30; A61J 2205/50; A61J 2205/60
USPC ........................................................ 382/103
See application file for complete search history.

(56) References Cited

U.S. PATENT DOCUMENTS

| | | | |
|---|---|---|---|
| 6,425,764 B1 | 7/2002 | Lamson | |
| 9,215,293 B2 | 12/2015 | Miller | |
| 9,293,060 B2* | 3/2016 | Hanina | ............... G06F 19/3418 |
| 9,338,589 B2 | 5/2016 | Loxam | |
| 9,418,293 B2 | 8/2016 | Ito | |
| 2006/0215495 A1* | 9/2006 | Soled | .................... A61J 7/0481 |
| | | | 368/10 |
| 2008/0105588 A1* | 5/2008 | Tran | .................... G06F 19/3462 |
| | | | 206/534 |

(Continued)

OTHER PUBLICATIONS

Bekelis, Kimon, et al., Effect of an Immersive Preoperative Virtual Reality Experience on Patient Reported Outcomes: A Randomized Controlled Trial, Annals of Surgery, Jun. 2017, pp. 1068-1073, vol. 265, Issue 6, Wolters Kluwer Health, Inc., Philadelphia, U.S.

*Primary Examiner* — Jonathan S Lee
(74) *Attorney, Agent, or Firm* — Ellenoff Grossman & Schole LLP; James M. Smedley; Alex Korona

(57) ABSTRACT

A system for organizing materials is disclosed. The system has a material organization module, comprising computer-executable code stored in non-volatile memory, a processor, an object recognition imaging device, and a user interface. The material organization module, the processor, the object recognition imaging device, and the user interface are configured to use the object recognition imaging device to determine spatial data and image data, use the image data to display an actual image of a container including a plurality of compartments on the user interface, and display one or more computer-generated edible material images that are superimposed, based on the spatial data, on at least one of the plurality of compartments of the actual image of the container.

20 Claims, 9 Drawing Sheets

(56) References Cited

U.S. PATENT DOCUMENTS

| | | | |
|---|---|---|---|
| 2008/0274241 A1* | 11/2008 | Steuer | A23G 1/005 426/231 |
| 2015/0154750 A1* | 6/2015 | Royaee | H04N 7/188 382/128 |
| 2015/0269593 A1* | 9/2015 | Le | G06Q 30/0185 705/2 |
| 2016/0147976 A1* | 5/2016 | Jain | A61J 1/035 705/2 |
| 2016/0364686 A1* | 12/2016 | Wolfe | G07F 17/0092 |
| 2018/0113018 A1* | 4/2018 | Bacon | B65D 83/38 |
| 2019/0269576 A1* | 9/2019 | Grosfils | A61J 7/0084 |

* cited by examiner

SYSTEM AND METHOD FOR ORGANIZING EDIBLE OR DRINKABLE MATERIALS

FIELD OF THE INVENTION

The present invention relates generally to a system and method for organizing materials, and more particularly, to a system and method for organizing edible or drinkable substances.

BACKGROUND OF THE INVENTION

Pill boxes are often used to assist medication users in organizing their medication and as a reminder to users to take their medication. For example, typical pill boxes often include individual compartments to hold pills, e.g., including a compartment for each day of the week. Medication users often fill their pill boxes for a given time period (e.g., at the beginning of the week), and take the medication out of a given compartment at a given time period. For example, on Tuesday, users take the pills disposed in a compartment designated for medication to be taken on Tuesday.

However, medication users often make errors in filling pill boxes, often forgetting to fill all suitable compartments with medication, inserting the wrong medication into compartments, and/or forgetting to put certain medications in the pill box. Additionally, medication users may forget guidelines for taking medication when the medication is removed from the pill box and taken. Further, conventional pill boxes lack safeguards against unintentional misuse of medication, such as safeguarding against taking unsuitable mixtures of medications.

The exemplary disclosed system and method of the present disclosure is directed to overcoming one or more of the shortcomings set forth above and/or other deficiencies in existing technology.

SUMMARY OF THE INVENTION

In one aspect, the present invention is directed to a system for organizing materials. The system includes a material organization module, comprising computer-executable code stored in non-volatile memory, a processor, an object recognition imaging device, and a user interface. The material organization module, the processor, the object recognition imaging device, and the user interface are configured to use the object recognition imaging device to determine spatial data and image data, use the image data to display an actual image of a container including a plurality of compartments on the user interface, and display one or more computer-generated edible material images that are superimposed, based on the spatial data, on at least one of the plurality of compartments of the actual image of the container.

In another aspect, the present invention is directed to a method for organizing medical pills. The method includes using an object recognition imaging device to determine spatial data and image data, and using the image data to display an actual image of a pill box including a plurality of compartments on a user interface. The method also includes displaying one or more computer-generated pill images on the user interface that are superimposed, based on the spatial data, on at least one of the plurality of compartments of the actual image of the pill box, and displaying a computer-generated image on the user interface prompting a user to confirm that actual pills matching the computer-generated pill images are disposed in the at least one of the plurality of compartments.

DETAILED DESCRIPTION AND INDUSTRIAL APPLICABILITY

Figure 3:
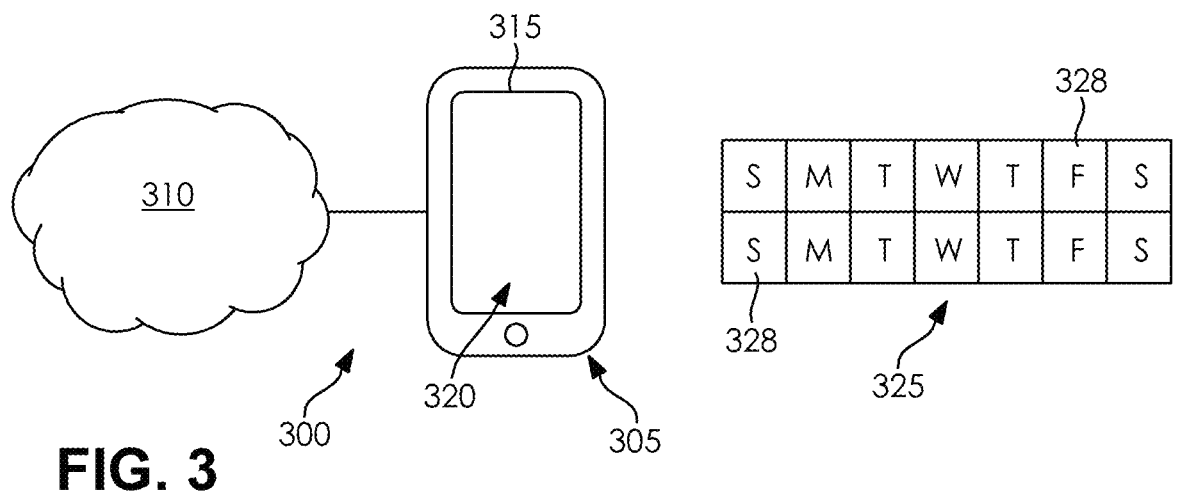
FIG. 3 is a schematic illustration of an exemplary embodiment of the present invention.

FIG. 3 illustrates an exemplary system 300 of the present disclosure. System 300 may be for example a system for organizing materials. For example, system 300 may be a system for organizing drinkable or edible materials. Further for example, system 300 may be a system for organizing drinkable or edible materials such as medication (e.g., prescription and/or non-prescription drugs and/or medications), health-related supplements and/or vitamins, foods (e.g., foods organized based on calories, carbohydrates, fat, protein and/or any other parameter to facilitate a desired regimen such as, for example, a training regimen, a diet regimen, and/or any other suitable regimen supporting a desired physical, health-related, medical, and/or any other suitable outcome or result based on ingesting the materials).

Figure 1:
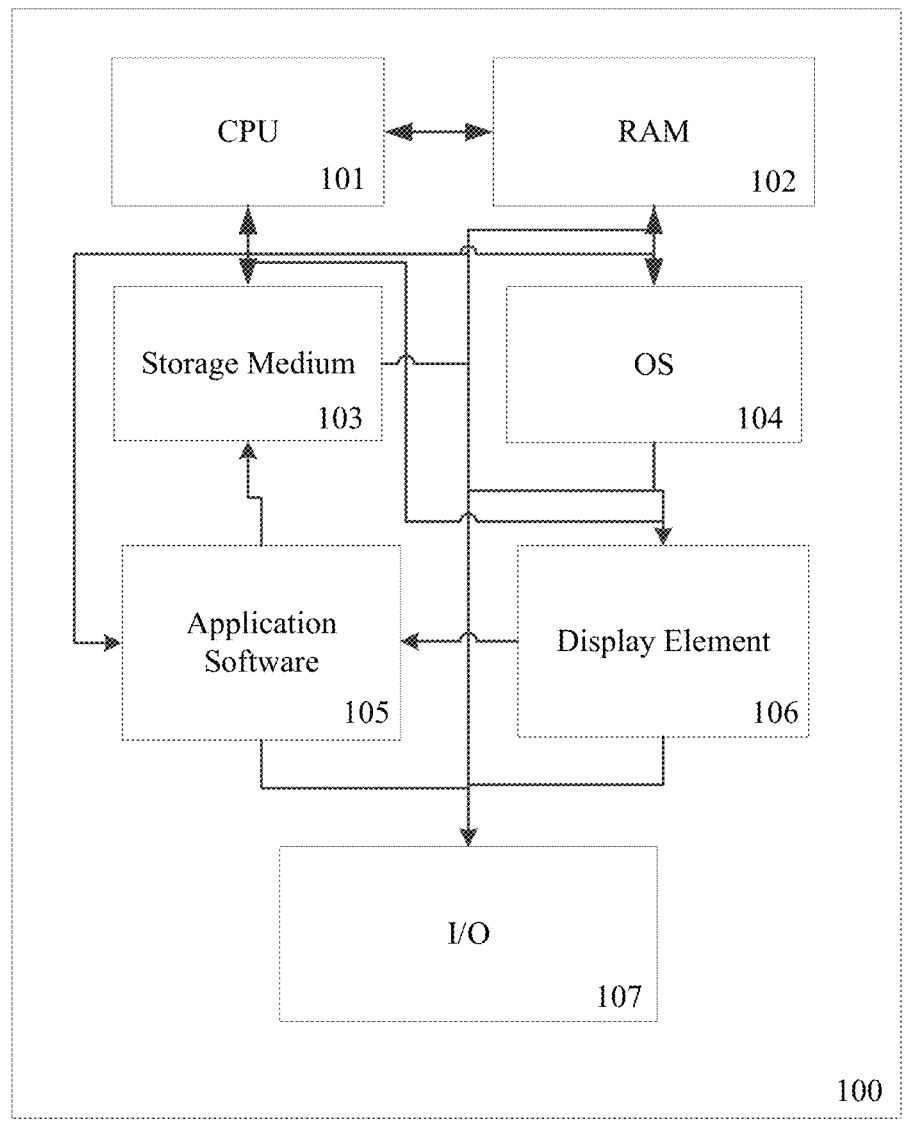
FIG. 1 illustrates a schematic overview of a computing device, in accordance with embodiments of the present invention.

System 300 may include a processor and a material organization module comprising computer-executable code stored in non-volatile memory, which may include components similar to components described below relating to FIGS. 1 and 2. System 300 may also include an object recognition imaging device and a user interface as described further below. The material organization module, the processor, the object recognition imaging device, and the user interface may operate together (e.g., as described below regarding FIGS. 1-15) to perform the exemplary processes described further below.

For example as illustrated in FIG. 3, system 300 may include a device 305 and a network 310. Device 305 may communicate with other components of system 300 via network 310 using techniques similar to the exemplary techniques described regarding FIG. 2 below.

Device 305 may for example include components comprising an object recognition imaging device 315 and a user interface 320. User interface 320 may be any suitable device for allowing a user to provide or enter input and receive output during an operation of system 300. For example, user interface may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, and/or any other suitable user interface (e.g., including components and/or configured to work with components described below regarding FIGS. 1 and 2). For example, user interface 320 may include a touchscreen device of a smartphone or handheld tablet. System 300 may be for example used to view any desired object such as, e.g., an object 325. Also for example, wherein the exemplary object recognition imaging device and the exemplary user interface may be components of a smart phone.

Object recognition imaging device 315 may include, for example, any suitable imaging device such as a camera. The exemplary device may also include components for finding points and features on an object within the field of vision of the device camera. For example, device 315 may include optical tracking components that may perform feature detection and matching to allow for matching and comparison of features imaged by device 315. For example, device 315 may include components configured to allow device 315 to find predetermined features that may correspond to two-dimensional and/or three-dimensional surfaces and/or contours of an object within a field of view of the camera of device 315. For example, device 315 may include components configured to use any suitable technique to identify features (e.g., spatial data) of a viewed object and to match those imaged features to predetermined features provided by system 300. For example, device 315 may identify a viewed object to be a container having a plurality of compartments. Also for example, device 315 may include components configured to perform optical character recognition of text and/or markings located on a viewed object. For example, device 315 may include any suitable components configured to view a container having a plurality of marked compartments and determine spatial and/or other data that may be matched to predetermined data provided by system 300 (e.g., predetermined shapes, text, contours, and other markings). For example, the spatial data and/or other data may include data defining contours of the plurality of compartments (e.g., compartments 328) and optical character recognition data based on an actual image of an object (e.g., object 325 that may be for example a container). For example, device 315 may provide spatial and/or other suitable data to system 300 that may be matched to predetermined data describing objects expected to be viewed by device 315. For example, device 315 may determine spatial and/or data based on viewing an object and provide such data to system 300, which may match that data to predetermined data to identify the object being viewed (e.g., to identify the object as a medication container such as, e.g., a pill box, a food container, a supplement container, and/or any other suitable container for storing materials such as edible and/or potable materials). For example, object recognition imaging device 315 may be configured to perform any suitable techniques for recognizing objects and/or determining spatial and/or other data of a viewed object for use with other components of system 300 (e.g., for use with the exemplary material organization module, processor, and/or user interface). Also for example, device 315 may recognize text (e.g., by using optical character recognition) or other markings on an exemplary object.

Object recognition imaging device 315 may be substantially entirely integrated into device 305. For example, object recognition imaging device 315 may include components of device 305 such as, for example, components of a camera of device 305 (e.g., a smartphone or tablet digital camera). Also for example, components described above for performing object recognition may be integrated into device 305.

Figure 4:
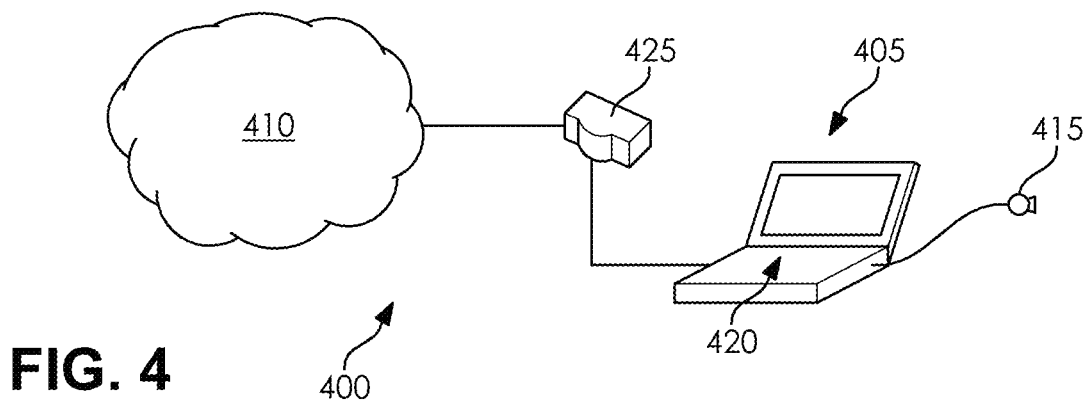
FIG. 4 is a schematic illustration of an exemplary embodiment of the present invention.

FIG. 4 illustrates an additional exemplary embodiment of the exemplary disclosed system. System 400 may be generally similar to system 300, and may include a device 405, a network 410, an object recognition imaging device 415, and a user interface 420 that include components generally similar to components of device 305, network 310, object recognition imaging device 315, and user interface 320, respectively. For example, user interface 420 may include components (e.g., monitor display and/or keyboard) of a device 405 such as a laptop or desktop computer. Also for example, object recognition imaging device 415 may include a standalone digital camera as well as object recognition components similar to those described above (e.g., and regarding FIGS. 1 and 2), which may be in communication (e.g., wireless and/or by physical connection such as a communication cable) with device 405. Similar to as described below regarding FIG. 2, device 405 may be for example connected to network 410 via a router 425.

Figure 5:
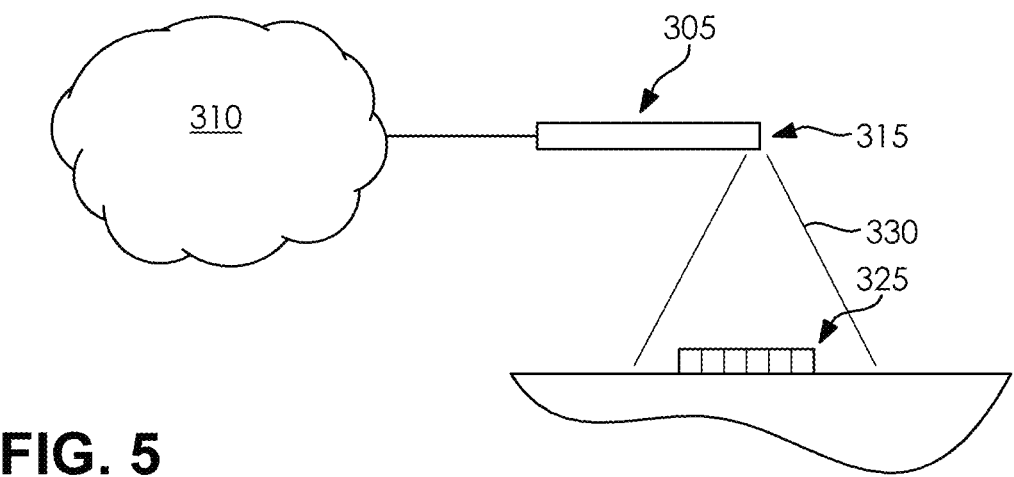
FIG. 5 is a schematic illustration of an exemplary embodiment of the present invention.

As illustrated for example in FIG. 5, device 305 may be held relative to object 325 so that object 325 is located within a field of view 330 of object recognition imaging device 315. For example, a user may hold device 305, which may be a smartphone, above object 325 so that object 325 is recognized by object recognition imaging device 315.

Object 325 may for example be any separate object that is not part of system 300 and is imaged and/or recognized by system 300. For example, object 325 may be a substantially entirely plastic (e.g., or metal, composite, wood, and/or any other suitable structural material) container having, e.g., a plurality of compartments for holding one or more materials. For example, object 325 may be a container having a plurality of compartments 328 for holding edible and/or potable materials. For example, object 325 may be a pill box having a plurality of compartments having markings (e.g., denoting time period such as day of the week, morning and afternoon, and/or any other suitable time period such as hour, week, and/or month). Also for example, the exemplary object may be any type of object that may be viewed in field of view 330.

Object 325 may also be, for example, a part of the exemplary system (e.g., system 300 and/or 400) having components that operate in conjunction with components of the exemplary material organization module, exemplary processor, exemplary object recognition imaging device (e.g., device 315 and/or 415), and/or exemplary user interface (e.g., user interface 320 and/or 420). For example, the exemplary object (e.g., object 325) may include any suitable component for operating as part of the exemplary system (e.g., system 300 and/or 400). For example, the exemplary object (e.g., object 325) may include predetermined markings (e.g., text and/or other markings) that may be recognized by the exemplary object recognition imaging device (e.g., device 315 and/or 415), which the exemplary processor and module may use in instructing components of the exemplary system (e.g., system 300 and/or 400). Also for example, the exemplary object (e.g., object 325) may include predetermined colors that may be recognized by the exemplary system (e.g., system 300 and/or 400) and used for any suitable purpose (e.g., calibrating color for material held in the exemplary object). Further for example, object 325 may be formed using predetermined dimensions, compartment sizes, and/or configurations that may be recognized by and used by the exemplary system (e.g., system 300 and/or 400).

The exemplary system and method disclosed herein may be used in any application for organizing and/or dispensing medication, health-related supplements, and/or any other suitable edible or drinkable (e.g., potable) materials taken by users at predetermined time periods. For example, the exemplary system may be used by individuals to assist in taking their personal medications and prescriptions. Also for example, the exemplary system and method may be incorporated into hospital, nursing home, and/or palliative systems (e.g., hospice care) for assisting individuals in taking medication.

An exemplary operation of the exemplary system and method will now be described. FIGS. 6-14 illustrate exemplary information and images that may be displayed on a display of the exemplary user interface (e.g., user interface 320 and/or 420) during the steps of exemplary process 500 illustrated in FIG. 15.

Figure 6:
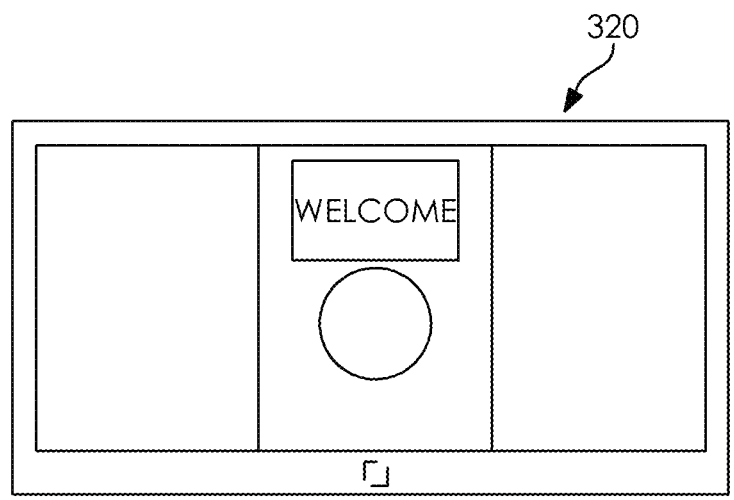
FIG. 6 illustrates an exemplary user interface display of an exemplary embodiment of the present invention.
Figure 15:
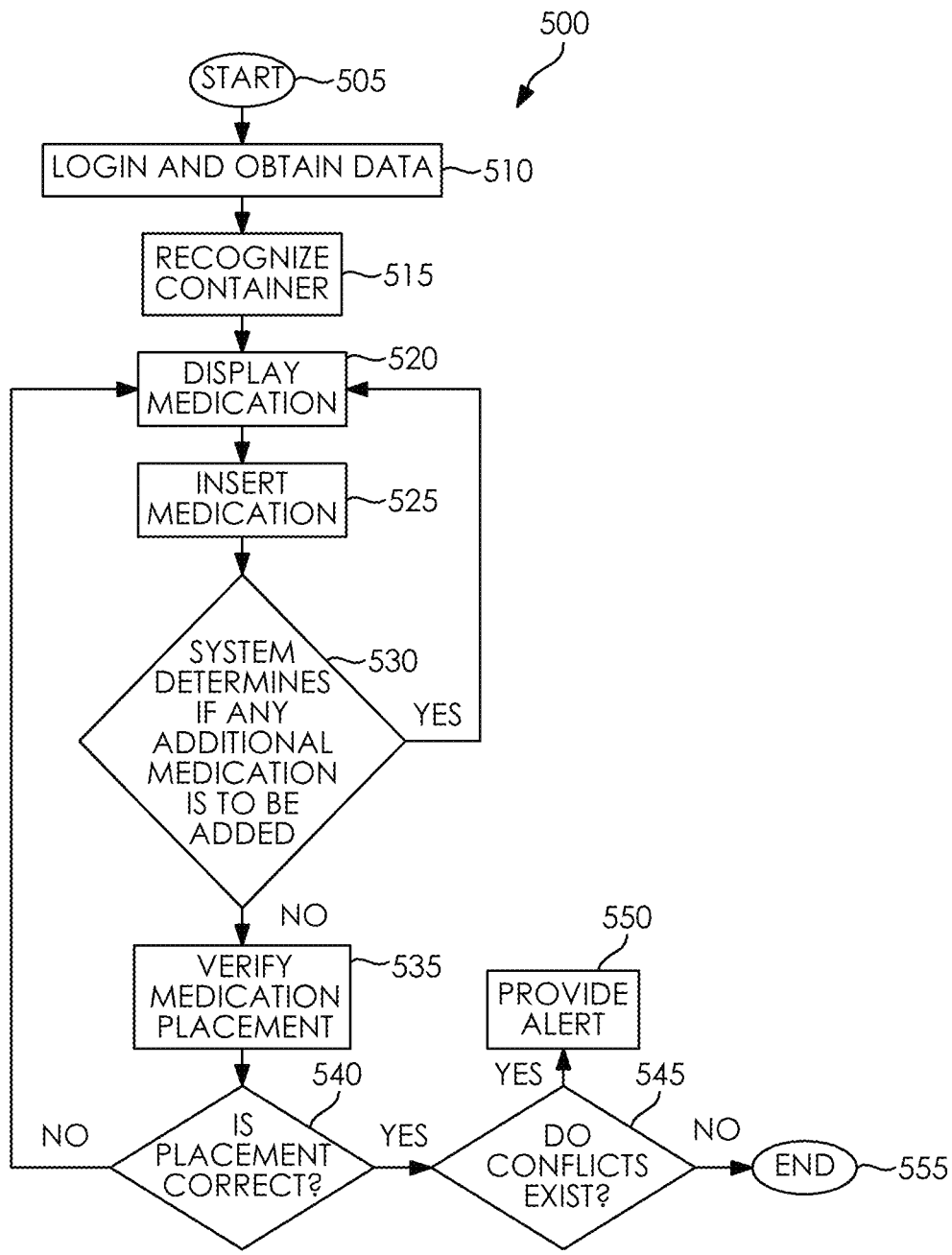
FIG. 15 illustrates a process flow of an exemplary embodiment of the present invention.

As illustrated in FIG. 15, the exemplary operation may start at step 505. At step 510, a user may access the system. For example, the user may provide login credentials and/or other requested information. For example as illustrated in FIG. 6, the exemplary system may prompt the user to provide biometric data to the user interface (e.g., by placing a thumb to a user interface that may be a touch screen and/or that may include components for receiving biometric data input). The system may also for example prompt a user to enter a username, password, and/or other login data.

After a user provides requested login information (if, for example, a user is prompted by the system), the system may receive patient data associated with the user who provided login information. Such patient data may be, for example, stored by the material organization module of the exemplary system and provided for use by the system when the user associated with the patient data uses the exemplary system. The patient data may also for example be provided to exemplary system 300 and/or 400 from a data source external to the respective system via respective network 310 and/or 410. For example, patient data may be provided via the exemplary network (e.g., network 300 and/or 400) from external sources such as primary care physician offices, specialist physician offices, pharmacies, healthcare providers, hospital systems, and/or any other suitable source of patient data for a given user.

Figure 7:
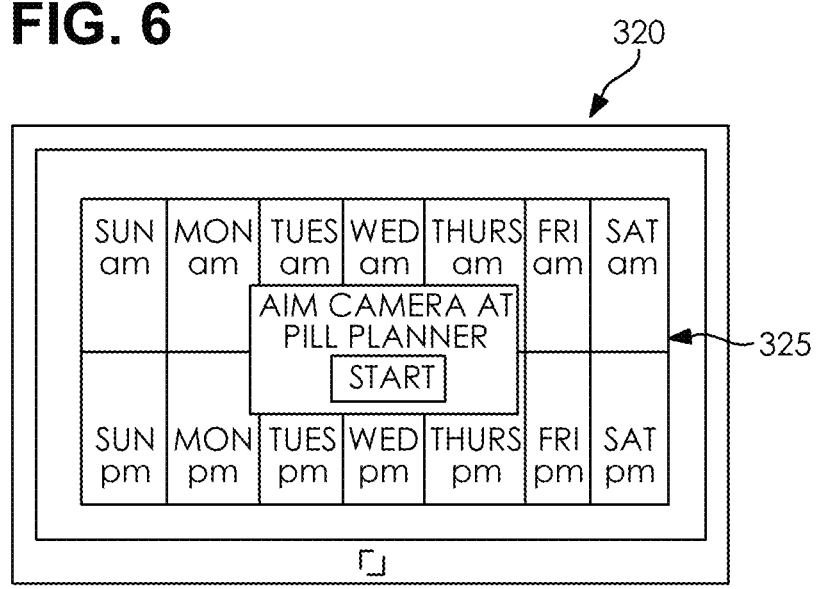
FIG. 7 illustrates an exemplary user interface display of an exemplary embodiment of the present invention.

At step 515, the exemplary system may prompt the user to recognize an object. For example, the exemplary system (e.g., system 300 and/or 400) may display an actual image of the field of view (e.g., field of view 330) of the exemplary object recognition imaging device (e.g., exemplary object recognition imaging device 315 and/or 415) on a display of the exemplary user interface (e.g., user interface 320 and/or 420). The exemplary system may also display a computer-generated image prompting the user to point the exemplary object recognition imaging device at a desired object. For example as illustrated in FIG. 7, the exemplary system may display computer-generated text prompting the user to aim the exemplary object recognition imaging device at object 325 (that may be for example a container such as a medication container, e.g., a pill box). When the user follows the prompt and aims the exemplary object recognition imaging device at the object (e.g., object 325), the exemplary object recognition imaging device may determine spatial data and/or other suitable data based on object recognition as described above. Similar to other actual objects in the exemplary field of view (e.g., field of view 330), the exemplary object recognition imaging device may also determine image data of the object (e.g., object 325) and may use the image data to display an actual image of the object (e.g., including a plurality of compartments of the object) on the user interface. The exemplary system may use the data (e.g., patient data, spatial data, image data, and/or any other suitable data) in displaying computer-generated images as disclosed below.

Figure 8:
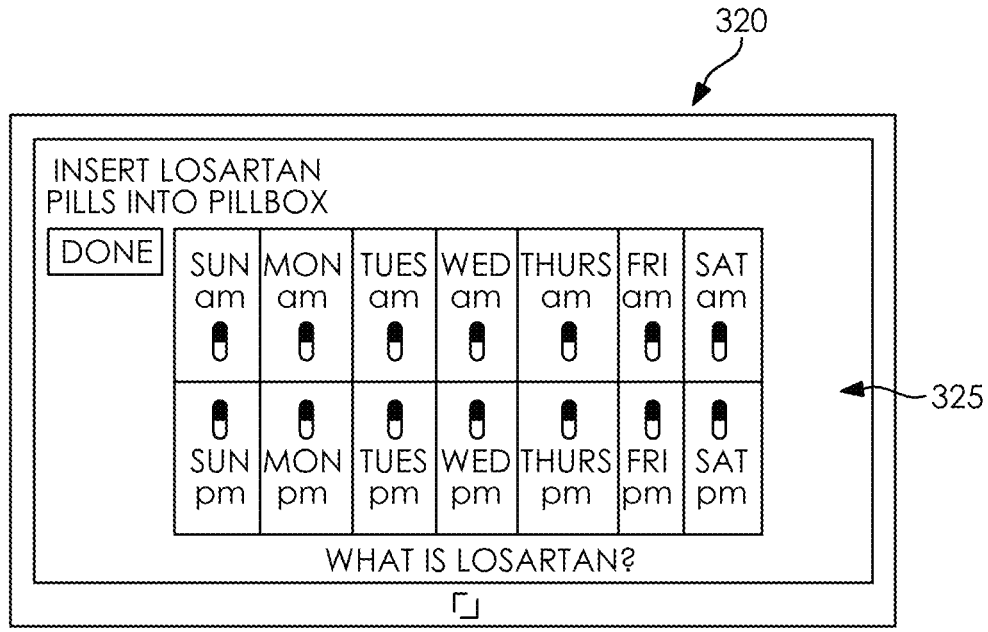
FIG. 8 illustrates an exemplary user interface display of an exemplary embodiment of the present invention.

At step 520, the exemplary system may prompt the user to fill the object (e.g., object 325 that may be for example as container, e.g., a pill box) according to a target arrangement. For example, the target arrangement may be a target medication arrangement of medical pills to be taken by a patient according to predetermined time periods (e.g., that may be set forth on object 325 as text and/or markings indicating days of the week and/or times of the day). For example as illustrated in FIG. 8, the exemplary system may display a target medication arrangement of material to be placed into object 325. For example, the exemplary system may prompt a user to place medical pills into object 325 by displaying computer-generated images of pills that match an actual appearance of the actual pills. For example as illustrated in FIG. 8, the system may display a computer-generated image matching an actual appearance of a given pill (e.g., Losartan) over compartments (e.g., compartment 328) of object 325 corresponding to desired time frames (e.g., an image one or more Losartan pill may be displayed as superimposed over actual compartments 328 corresponding to some or all of morning and/or afternoon of some or all days of the week). The target arrangement may be based on, e.g., patient data stored by the exemplary system, provided by the exemplary network as described herein, and/or updated via the exemplary network (e.g., updates may be provided to the exemplary system from external data sources as described herein, e.g., by physicians of the user).

For example, the exemplary material organization module, the exemplary processor, the exemplary object recognition imaging device (e.g. device 315 and/or 415), and the exemplary user interface (e.g., user interface 320 and/or 420) may be configured to use the exemplary object recognition imaging device to determine spatial data and image data, use the image data to display an actual image of a container (e.g., object 325) including a plurality of compartments (e.g., 328) on the user interface, and/or display one or more computer-generated edible material images that may be superimposed, based on the spatial data, on at least one of the plurality of compartments of the actual image of the container.

Figure 9:
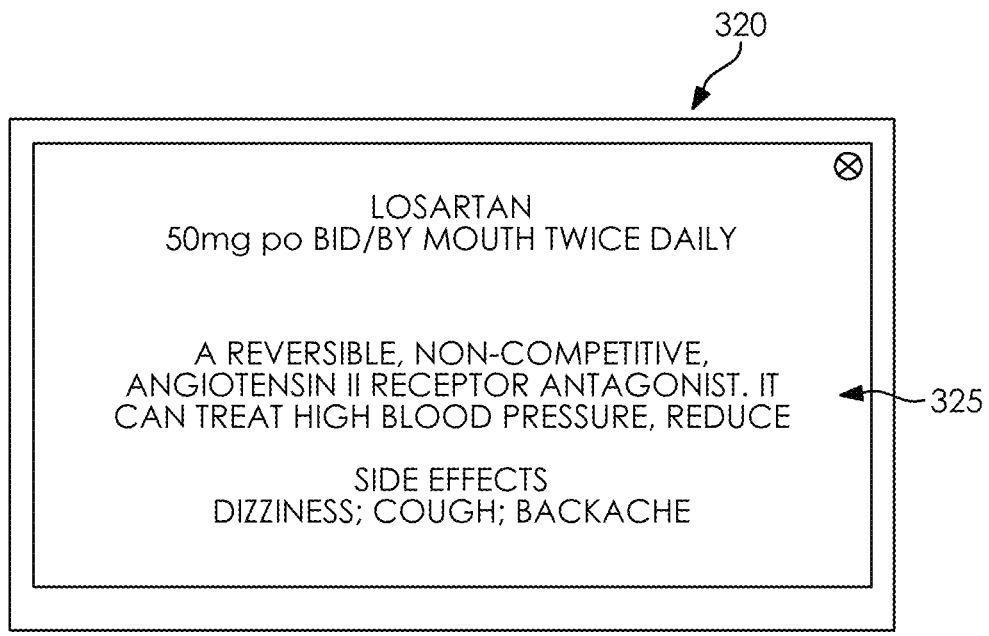
FIG. 9 illustrates an exemplary user interface display of an exemplary embodiment of the present invention.

In addition to displaying a target arrangement as illustrated in FIG. 8, the system may display computer-generated information regarding a given material (e.g., information regarding a medication such as a medical pill) on the display of the exemplary user interface. For example as illustrated in FIG. 9, the system may display computer-generated text describing a material on the user interface (e.g., information regarding medical pill Losartan). For example, the system may provide medication dosage to be taken for medications placed in a plurality of compartments of object 325, which may correspond to timing to take the medication. Also for example, the system may provide medical details regarding the medication such as, for example, instructions on how to take the medication (e.g., with or without food and/or water, foods and activities to avoid while taking the medications, side effects of the medication, and/or any other suitable medication).

Also for example, the exemplary system may provide an alert (e.g., computer-generated image displayed on the user interface and/or other alerts such as an audio alert or a visual alert such as blinking light) to users to take certain actions. For example, the system may alert a user to refill a container (e.g., object 325) with material (e.g., medications such as pills, vitamins, supplements, and/or other materials). Also for example, based on data of a target (e.g., or actual) material arrangement to be disposed in the exemplary object (e.g., object 325), the system may provide an alert to a user to ingest material (e.g., take medication such as a pill based on a specific date and/or time based on patient data such as a user's physician's orders and/or prescriptions). Further for example, the system may alert a user and/or external entities such as a user's physician or hospital (e.g., or emergency contacts such as family or friends) if a user has not taken material (e.g., medication) out of the exemplary object (e.g., medical container). The exemplary system may also prompt a user with special instructions for ingesting material (e.g., to take materials such as medications at a certain time, wait a certain amount of time for taking a second pill after taking a first pill, take medication with or without water and/or food, and/or avoid certain other items or activities while taking the medication such as sunlight, intense physical exercise, and/or certain types of foods or liquids).

Further for example, the system may provide alternative materials to a user based on data of a target material arrangement (e.g., or an actual material arrangement) and/or user data such as patient data. For example, based on material to be disposed in the exemplary object (e.g., object 325) and/or user data (e.g., patient data from electronic health records and/or from other sources having medical data associated with the user), the system may display images (e.g., or provide any suitable notification such as audio messages) to propose other materials as an alternative to materials to be disposed in the exemplary object (e.g., object 325). For example, the exemplary system may propose alternative medications (e.g., lower cost medications, more effective medications, and/or generic medications) for one or more medications (e.g., pills) to be disposed in the exemplary object (e.g., object 325 that may be a pill box). For example, the exemplary system may display data identifying alternative medications on the exemplary user interface based on user data (e.g., patient data).

Figure 10:
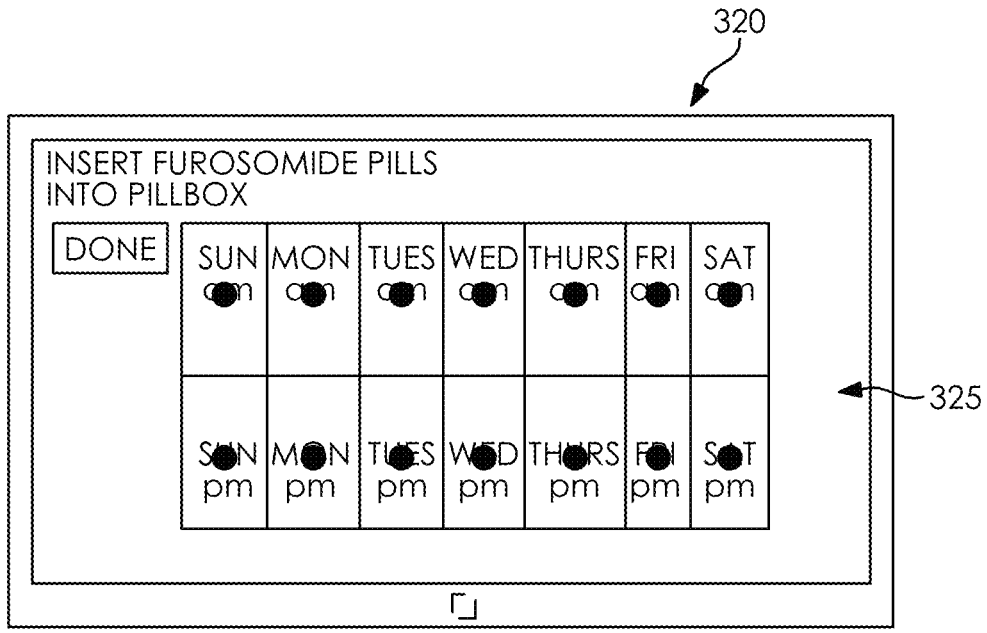
FIG. 10 illustrates an exemplary user interface display of an exemplary embodiment of the present invention.
Figure 11:
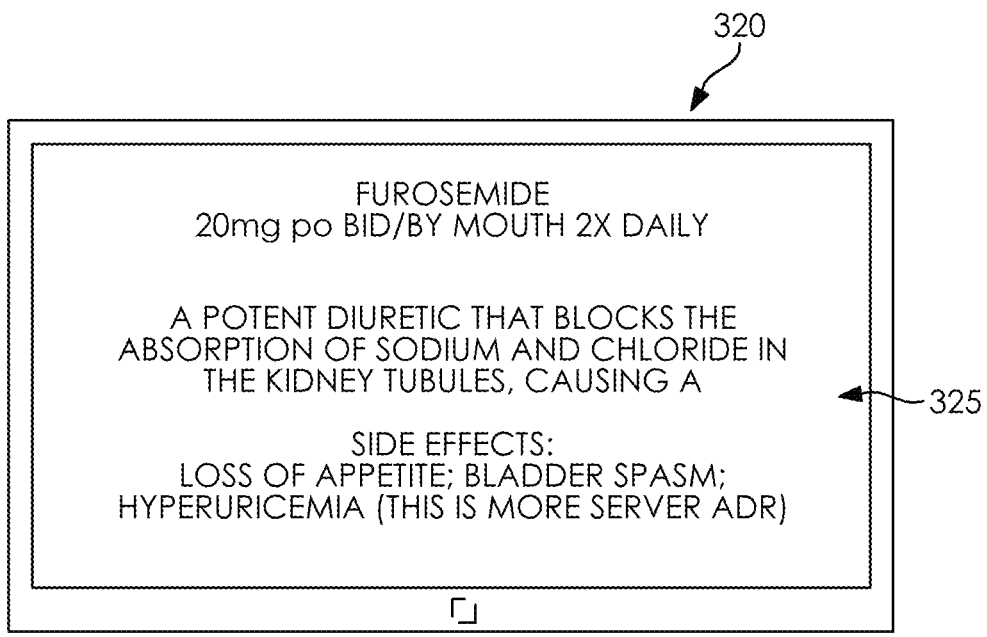
FIG. 11 illustrates an exemplary user interface display of an exemplary embodiment of the present invention.
Figure 12:
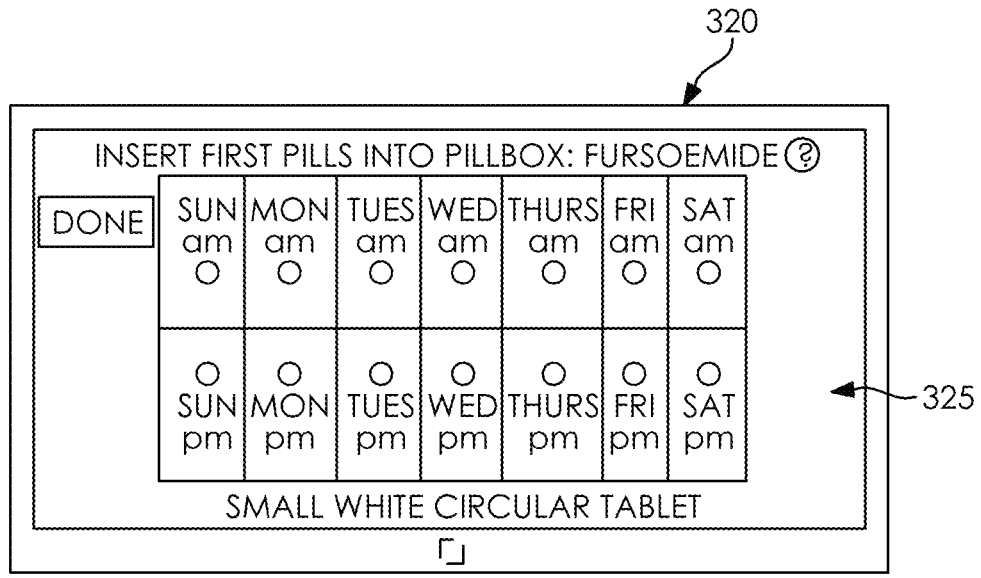
FIG. 12 illustrates an exemplary user interface display of an exemplary embodiment of the present invention.

FIGS. 10 and 11 illustrate an additional exemplary target arrangement that the exemplary system may display on the user interface. For example, the system may prompt the user to put material (e.g., Furosomide pills) into all compartments 328 of object 325 by displaying computer-generated images corresponding to an actual appearance of the material (e.g., actual appearance of a Furosomide pill) as superimposed on the actual image of object 328 (e.g., real-time image as imaged within field of view 330). Such images may help a user to place actual material resembling the displayed images into the exemplary object, thereby helping to ensure a correct placement of material. If desired by a user (e.g., by pressing on a computer-generated image such as of the material or a question mark when user interface is a touch screen, and/or pressing a given keyboard key), the system may display information regarding the material (e.g., information regarding Furosomide) as computer-generated text, dialogue box, and/or other displayed indication on the user interface. Also for example, FIG. 12 illustrates another exemplary embodiment of a display of material (e.g., Furosomide pills) that the exemplary system may prompt a user to insert into object 325.

Returning to FIG. 15, a user may insert material at step 525 (e.g., medication, supplements, vitamins, food, and/or other suitable edible and/or drinkable materials) according for example to the above-described prompts and/or instructions. After inserting material into the object (e.g., object 325) in field of view 330, the user may press a computer-generated image (e.g., or provide input to the system in any other suitable way such as via keyboard and/or audio input) displayed on the user interface to indicate to the exemplary system that the material has been placed into object 325. For example, the user may press a computer-generated image of a button marked "done" (e.g., or any other suitable image or prompt) such as illustrated in FIGS. 8, 10, 12, and 13. For example, the exemplary system may display a computer-generated image on the exemplary user interface prompting a user to confirm that actual pills matching computer-generated pill images are disposed in the at least one of the plurality of compartments (e.g., compartments 328), and the user may press (e.g., or otherwise suitably enter data) the image to indicate that the pills have been placed in the exemplary object.

Figure 13:
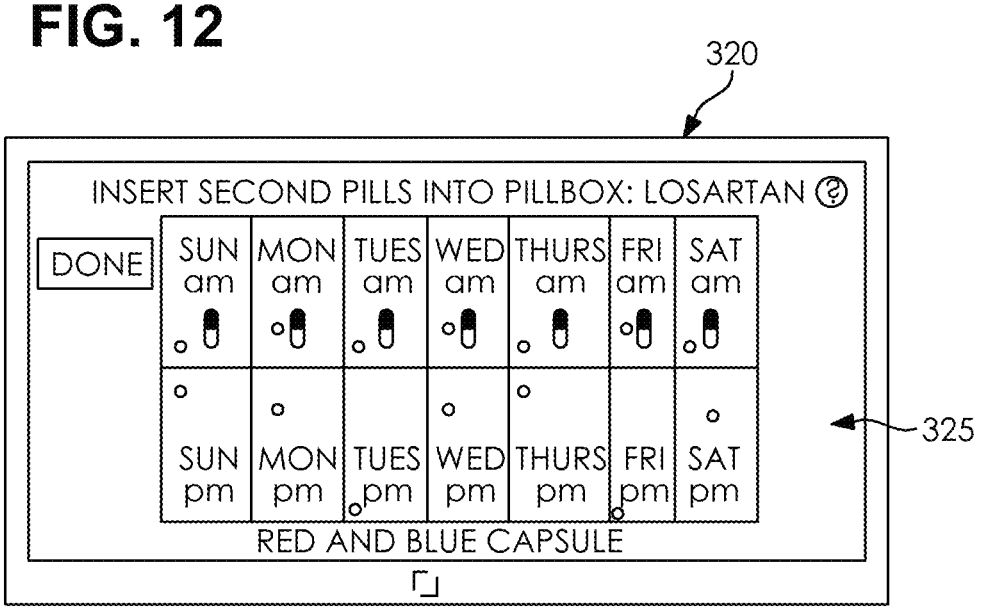
FIG. 13 illustrates an exemplary user interface display of an exemplary embodiment of the present invention.

After the user indicates that the medication has been placed into the exemplary object in step 525, the system determines at step 530 if any additional material is to be placed in the exemplary object (e.g., object 325). For example, the exemplary system (e.g., system 300 and/or 400) may determine if additional material (e.g., medication such as pills) is to be added to the exemplary object based on user data or patient data as described herein (e.g., as stored by the exemplary system and/or as provided by external sources for example based on patient medical records and/or other suitable sources). If additional material is to be added, the system returns to step 520 to display additional material to be added to the object. Steps 520, 525, and 530 may be repeated as suitable based on material to be added based on user data (e.g., patient data). For example, FIG. 13 illustrates an exemplary embodiment in which actual medication is disposed in object 325 and displayed on the user interface, and computer-generated images of a second material to be added to object 325 is also displayed on the user interface.

If the system determines at step 530 based on user data (e.g., patient data) that no additional material is to be added to one or more compartments 328 of object 325, then the system verifies material placement (e.g., the actual material arrangement) at step 535. It is also contemplated that step 535 may alternatively be performed after each or some placements of material (e.g., after some or each iterations of steps 520, 525, and 530) to perform interim verification of proper material placement as described below.

At step 535, the exemplary system may verify if an arrangement of material placed in the exemplary object by a user matches a predetermined arrangement of material. For example, the exemplary system may determine data defining an actual arrangement of one or more edible materials disposed in at least one of the plurality of compartments (e.g., compartment 328). For example, the exemplary system may verify if material (e.g., medication such as pills for medical treatment) placed in object 325 (e.g., a medication container such as a pill box) matches a predetermined arrangement of material (e.g., pills placed in a plurality of compartments corresponding to time periods for taking medication such as morning, afternoon, and/or day of the week) based for example on user data (e.g., patient data such as prescriptions and/or physician instructions determining type, timing, and/or dosage of medications to be taken). For example, the system may use the object recognition imaging device (e.g., device 315 and/or 415) to generate spatial data and/or other data describing an actual arrangement of material in object 325. For example, the exemplary object recognition imaging device may be used to recognize a size, shape, color, and/or text or markings disposed on medication to identify the medication. For example, the system may compare data determined by object recognition with predetermined data describing medication (e.g., including size, shape, color, and/or text or markings) stored by the medication organization module or provided to the system by external data sources (e.g., physician or hospital records and/or medical history databases). The system may thereby determine if data describing an actual arrangement of material (e.g., medications) disposed in a viewed object (e.g., object 325) is substantially the same as data describing a target arrangement of material (e.g., a target arrangement of medications based on, e.g., physician's records, hospital records, patient prescriptions, patient history, and/or medical records).

For example, the exemplary system may use the exemplary object recognition imaging device to determine first data defining an actual arrangement of one or more actual medications disposed in at least one of the plurality of compartments (e.g., compartments 328). The exemplary system may also determine second data defining a target medication arrangement based on patient data (e.g., based on data stored in the exemplary material organization module) and spatial data (e.g., provided by the exemplary object recognition imaging device), and display confirmation data on the exemplary user interface if the first data is substantially the same as the second data. Also for example, the exemplary system may display an alert on the exemplary user interface if the first data is substantially different from the second data. Further for example, the exemplary system may display data identifying two medications that conflict with each other based on one of user or patient data, the first data, or the second data.

Based on the verification and confirmation (e.g., comparison of data of the actual arrangement of material and the target arrangement of material) of step 535, the system may determine at step 540 to repeat steps 520, 525, 530, and 535 if data of the actual arrangement of material (e.g., medication) does not correspond to data of the target arrangement of material. For example, the system may display computer-generated prompts for a user to remove material from one or more compartments of object 325 and again display computer-generated images of material (e.g., pills) that should be placed in the viewed object (e.g., object 325) as described above.

Figure 14:
FIG. 14 illustrates an exemplary user interface display of an exemplary embodiment of the present invention.

If the system determines at step 540 that the data of the actual arrangement of material is substantially the same as the data of the target arrangement of material based on the comparison at step 535, then the process may proceed to step 545. At step 545, the system may determine whether any potential conflicts exist based on the data describing the actual arrangement of material (e.g., or based on the data describing the target arrangement of material). For example, the system may compare the data of an actual (e.g., or target) arrangement of medication to medical conflict data (e.g., data stored in the material organization module regarding the user, e.g., electronic health records and patient history, and/or data provided by medical sources regarding medication conflicts for example in general). For example, if the actual (e.g., or target) arrangement of medication may be unsafe if taken together or within certain time frames of each other, or if the medication is unsafe for the user based on user data or patient data such as the user's medical history and/or electronic health records, the system may provide an alert at step 550. For example, the system may alert the user via the user interface (e.g., image alert and/or audio alert) and/or send an alert via the exemplary network (e.g., network 310 and/or 410) to one or more external healthcare entities such as, for example, the user's physician, pharmacist, hospital, and/or healthcare provider. If the system determines that no conflict exists based on a comparison of data of the actual (e.g., or target) arrangement and the conflict data (e.g., medical conflict data), then the system may end the process at step 555. For example, the system may display a computer-generated image that the object (e.g., medical pill container) has been properly filled with material as illustrated in FIG. 14. For example, the exemplary system may display confirmation data on the exemplary user interface if the data (e.g., data determined based on the exemplary object recognition imaging device) substantially matches data defining an arrangement of one or more computer-generated edible material images (e.g., data of a target arrangement based on for example patient data).

In at least some exemplary embodiments, the exemplary material organization module may include a database of information relating to the materials to be disposed in the exemplary object (e.g., object 325). For example, the database may include data relating to the size, shape, color, and/or text or markings on the material (e.g., of some or all medications such as pills available for use by patients), data relating to a user (e.g., patient biometric data, patient electronic health records, biographical data, and/or any other user suitable data), and/or data relating to general information regarding the material (e.g., medical literature regarding material such as medications and pills, e.g., including potential conflicts with other medications, potential or actual recalls of medications, side effects of medications, and/or any other information regarding the medications). The exemplary database (e.g., that may be stored on the exemplary material organization module) may be updated by the exemplary system for example based on input from operators of the exemplary system, users of the exemplary system, and/or based on data updates via the exemplary network (e.g., network 310 and/or 410) from external databases such as, for example, pharmaceutical companies, healthcare providers, government agencies such as the Food and Drug Administration, consumer advocacy agencies, medical associations, physician's offices, and/or hospital systems. For example, the exemplary material organization module may include a patient history database that is updated by external databases via a network (e.g., network 310 and/or 410). For example, if one or more of the exemplary organizations determines that one or more materials should not be ingested based on certain conditions (e.g., multiple medications during the same time period, or by users matching certain biographic data such as age or having certain medical conditions), corresponding data may be sent to the exemplary system to, for example, provide suitable alerts or warnings at step 550 based on a system analysis at step 545 using updated data (e.g., using a database of the exemplary material organization module that has been updated based on data provided by an external source).

It is also contemplated that the material to be disposed in the exemplary object (e.g., object 325) may include tracking information such as, for example, radio-frequency identification (RFID) elements. For example, the edible or drinkable material (e.g., medication such as pills, supplements, vitamins, or other materials) may include tracking information such as RFID elements that may be activated when material is ingested. For example, the exemplary system may include components (e.g., included as part of device 305 and/or 405) such as near field communication devices configured to recognize and read RFID elements. For example, the exemplary object recognition imaging device (e.g., device 315 and/or device 415) may include RFID-reading components. For example, when material is removed from the exemplary object (e.g., pills taken from object 325 that may be a pill box) and is ingested by a user, RFID elements disposed in the material may be activated, which may be recognized and recorded as data by the exemplary system. The exemplary system may then, for example, confirm whether or not a user is taking material according to recommendations by attending personnel or organizations (e.g., a doctor, hospital staff, nursing home or hospice staff, psychiatric care staff, dieticians, and/or other personnel or organizations). If for example a user is not taking material out of the exemplary object (e.g., object 325) and ingesting it as confirmed by use for example of RFID components as described above (e.g., or as confirmed by any other suitable method such as, for example, data obtained of the user taking material such as medication via use of the exemplary object recognition imaging device), then the exemplary system may provide an alert as described above regarding step 550.

The exemplary disclosed system and method may provide a technique for assisting a user in placing materials into a container in a suitable manner. For example, the exemplary disclosed system and method may assist a user in placing medication into a pill box in an arrangement that matches the user's prescriptions and physician instructions. Also for example, the exemplary disclosed system and method may assist a user in placing vitamins, supplements, and other edible materials into a container in a way that matches a predetermined regimen (e.g., a regimen designed to promote good health). Further for example, the exemplary disclosed system and method may verify and confirm that material has been placed in a suitable manner in a container (e.g., that pills have been placed correctly into a pill box having compartments corresponding to days and/or times to take medications). Additionally for example, the exemplary disclosed system and method may identify potential conflicts between material placed into a container (e.g., may identify conflicts between medications placed into a pill box based on user medical history and/or medical data regarding conflicting medications that should not be taken together).

In the description above, the detailed description, the claims below, and in the accompanying drawings, reference is made to particular features (including method steps) of the various embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

According to an embodiment of the present invention, the system and method may be configured to share with and/or receive data from one or more computing devices. As shown in FIG. 1, one of ordinary skill in the art would appreciate that a computing device 100 appropriate for use with embodiments of the present application may generally be comprised of one or more of the following: a central processing unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smartphones, laptops, mobile computing devices, tablet PCs and servers. The term 'computing device' may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 2:
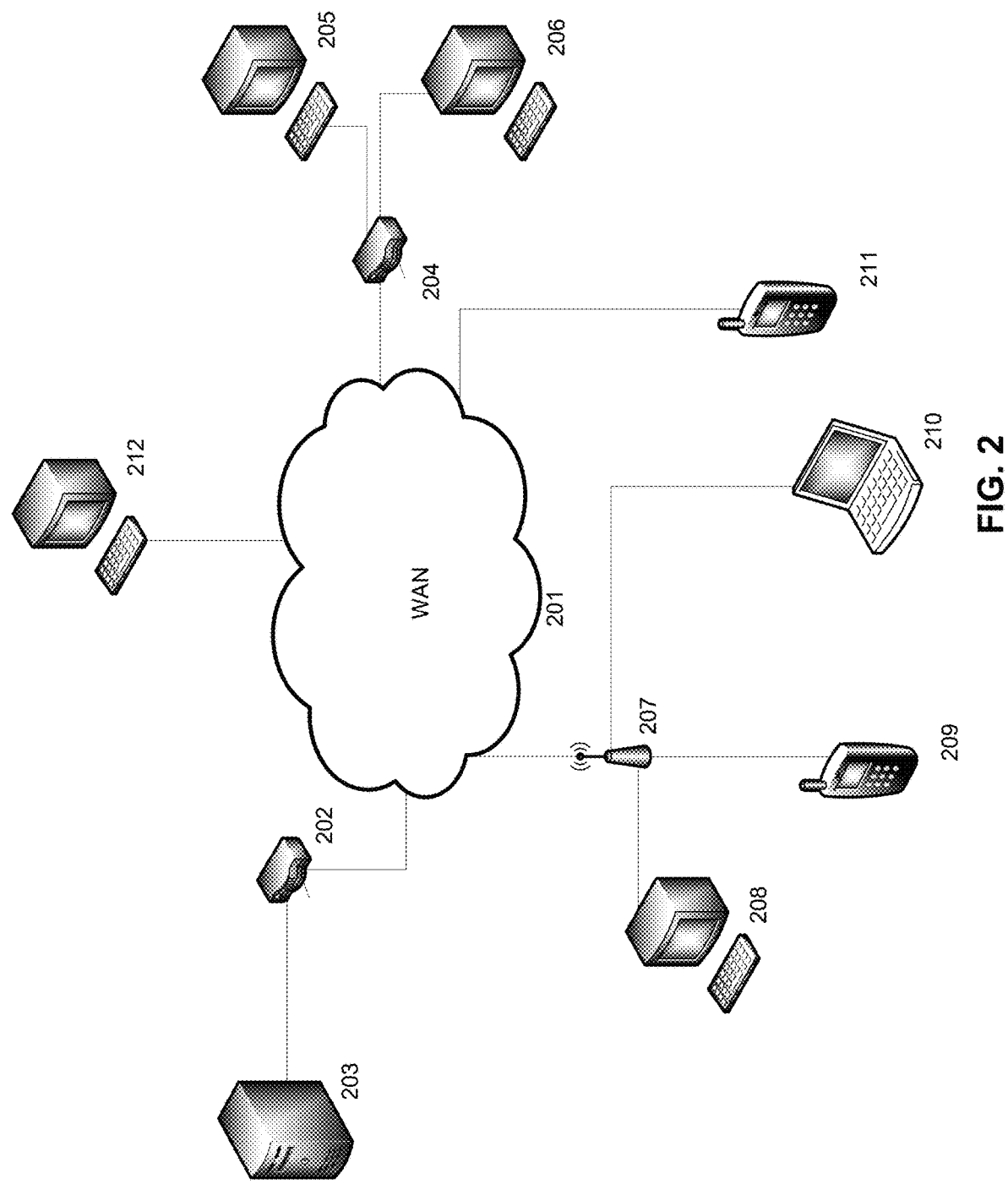
FIG. 2 illustrates a schematic overview of a network, in accordance with embodiments of the present invention.

Referring to FIG. 2, a schematic overview of a cloud-based system in accordance with an embodiment of the present invention is shown. The cloud-based system is comprised of one or more servers 203 (e.g., application servers, database servers, and other servers) for computing, analyzing and electronically storing information used by the system. Applications in one or more of the servers 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more high speed connections. High speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GSM, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, the system could be comprised of a personal computing device, such as a smartphone, acting as a host for other computing devices to connect to.

Traditionally, a computer program consists of a finite sequence of computational instructions or program instructions. It will be appreciated that a programmable apparatus (e.g., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In an exemplary embodiment of the present invention, the data store may be a relational database, working in conjunction with a relational database management system (RDBMS) for receiving, processing and storing data. In an exemplary embodiment, the data store may comprise one or more databases for storing information related to the processing of moving information and estimate information as well one or more databases configured for storage and retrieval of moving information and estimate information.

Computer program instructions such as those required to operate the software component of the present invention can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Python, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The suitable structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

Insofar as the description above and the accompanying drawings disclose any additional subject matter that is not within the scope of the claims below, the inventions are not dedicated to the public and the right to file one or more applications to claim such additional inventions is reserved.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A system for organizing materials, the system comprising:
a material organization module, comprising computer-executable code stored in non-volatile memory;
a processor;
an object recognition imaging device; and
a user interface;
wherein the material organization module, the processor, the object recognition imaging device, and the user interface are configured to:
use the object recognition imaging device to determine spatial data and image data;
use the image data to display an actual image of a container including a plurality of compartments on the user interface; and
display one or more computer-generated edible material images that are superimposed, based on the spatial data, on at least one of the plurality of compartments of the actual image of the container.

2. The system of claim 1, wherein the material organization module, the processor, the object recognition imaging device, and the user interface are configured to use the object recognition imaging device to determine first data defining an actual arrangement of one or more edible materials disposed in at least one of the plurality of compartments.

3. The system of claim 2, wherein the material organization module, the processor, the object recognition imaging device, and the user interface are configured to display confirmation data on the user interface if the first data substantially matches data defining an arrangement of the one or more computer-generated edible material images.

4. The system of claim 1, wherein the container is a pill box.

5. The system of claim 1, wherein the computer-generated edible material images are medical pill images.

6. The system of claim 1, wherein the object recognition imaging device and the user interface are components of a smart phone.

7. The system of claim 6, wherein the object recognition imaging device includes RFID-reading components.

8. The system of claim 1, wherein the spatial data includes data defining contours of the plurality of compartments and optical character recognition data based on the actual image of the container.

9. The system of claim 1, wherein the material organization module includes a patient history database that is updated by external databases via a network.

10. A system for organizing medication, the system comprising:
- a medication organization module, comprising computer-executable code stored in non-volatile memory;
- a processor;
- an object recognition imaging device; and
- a user interface;
- wherein the medication organization module, the processor, the object recognition imaging device, and the user interface are configured to:
- receive patient data;
- use the object recognition imaging device to determine spatial data and image data;
- use the image data to display an actual image of a medication container including a plurality of compartments on the user interface;
- use the object recognition imaging device to determine first data defining an actual arrangement of one or more actual medications disposed in at least one of the plurality of compartments;
- determine second data defining a target medication arrangement based on the patient data and the spatial data; and
- display confirmation data on the user interface if the first data is substantially the same as the second data.

11. The system of claim 10, wherein the spatial data includes data defining contours of the plurality of compartments and optical character recognition data based on the actual image of the medication container.

12. The system of claim 10, wherein the medication organization module, the processor, the object recognition imaging device, and the user interface are configured to display data identifying alternative medications on the user interface based on the patient data.

13. The system of claim 10, wherein the medication organization module, the processor, the object recognition imaging device, and the user interface are configured to display an alert on the user interface if the first data is substantially different from the second data.

14. The system of claim 10, wherein the medication organization module, the processor, the object recognition imaging device, and the user interface are configured to display an alert on the user interface based on the patient data.

15. The system of claim 14, wherein displaying the alert includes displaying data identifying two medications that conflict with each other based on one of the patient data, the first data, or the second data.

16. A method for organizing medical pills, the method comprising:
- using an object recognition imaging device to determine spatial data and image data;
- using the image data to display an actual image of a pill box including a plurality of compartments on a user interface;
- displaying one or more computer-generated pill images on the user interface that are superimposed, based on the spatial data, on at least one of the plurality of compartments of the actual image of the pill box; and
- displaying a computer-generated image on the user interface prompting a user to confirm that actual pills matching the computer-generated pill images are disposed in the at least one of the plurality of compartments.

17. The method of claim 16, further comprising displaying one or more second computer-generated pill images that are superimposed, based on the spatial data, on at least one of the plurality of compartments of the actual image of the pill box.

18. The method of claim 16, wherein the object recognition imaging device and the user interface are components of a smart phone.

19. The system of claim 16, wherein the spatial data includes data defining contours of the plurality of compartments and optical character recognition data based on the actual image of the pill box.

20. The system of claim 16, further comprising displaying data identifying alternative pills on the user interface based on the image data.

* * * * *